United States Patent [19]
Tokura

[11] Patent Number: 5,678,124
[45] Date of Patent: Oct. 14, 1997

[54] PRINTING APPARATUS WITH MEANS OF COMPARING PAPER SIZE SPECIFIED BY AN EXTERNAL APPARATUS WITH A CALCULATED PAPER SIZE

[75] Inventor: Yutaka Tokura, Machida, Japan

[73] Assignee: Canon Kabushiki Kaisha, Tokyo, Japan

[21] Appl. No.: 420,765

[22] Filed: Apr. 12, 1995

[30] Foreign Application Priority Data

Apr. 14, 1994 [JP] Japan ................................ 6-100761

[51] Int. Cl.⁶ ........................................... G03G 15/00
[52] U.S. Cl. ................................. 399/26; 347/139
[58] Field of Search ........................... 355/206, 207, 355/311; 346/134; 347/139; 395/111, 113; 271/9.01, 9.06, 9.09, 258.03, 258.04; 399/16, 23, 388, 389, 394; 358/296

[56] References Cited

U.S. PATENT DOCUMENTS

| | | | |
|---|---|---|---|
| 5,291,225 | 3/1994 | Saito | 346/134 |
| 5,464,204 | 11/1995 | Suzuki | 271/258.04 X |
| 5,512,928 | 4/1996 | Kato et al. | 347/139 X |

*Primary Examiner*—Joan H. Pendegrass
*Attorney, Agent, or Firm*—Fitzpatrick, Cella, Harper & Scinto

[57] ABSTRACT

A printing apparatus includes a measuring device for measuring the elapsed time for feeding a sheet of paper from its top edge to its bottom edge by feeding a first paper; a paper size calculating device for calculating a paper size on the basis of the measured time and the paper feeding rate which is determined by the printing apparatus; a calculated result transmitting device for transmitting the paper size calculated by the calculating device and informing an operator of the paper size; a comparing device for comparing the paper size calculated by the calculating device with the paper size specified by an external apparatus; a size setting device for setting within the printing apparatus the calculated paper size as a specified paper size for printing a second and later sheets when the above comparison indicates that both sizes match each other; a display device for displaying a mismatch of the paper size in order to inform an operator of the mismatch when the above comparison indicates that the paper sizes do not match each other; and a reprint control device for reprinting the page after the operator replaces the paper.

37 Claims, 14 Drawing Sheets

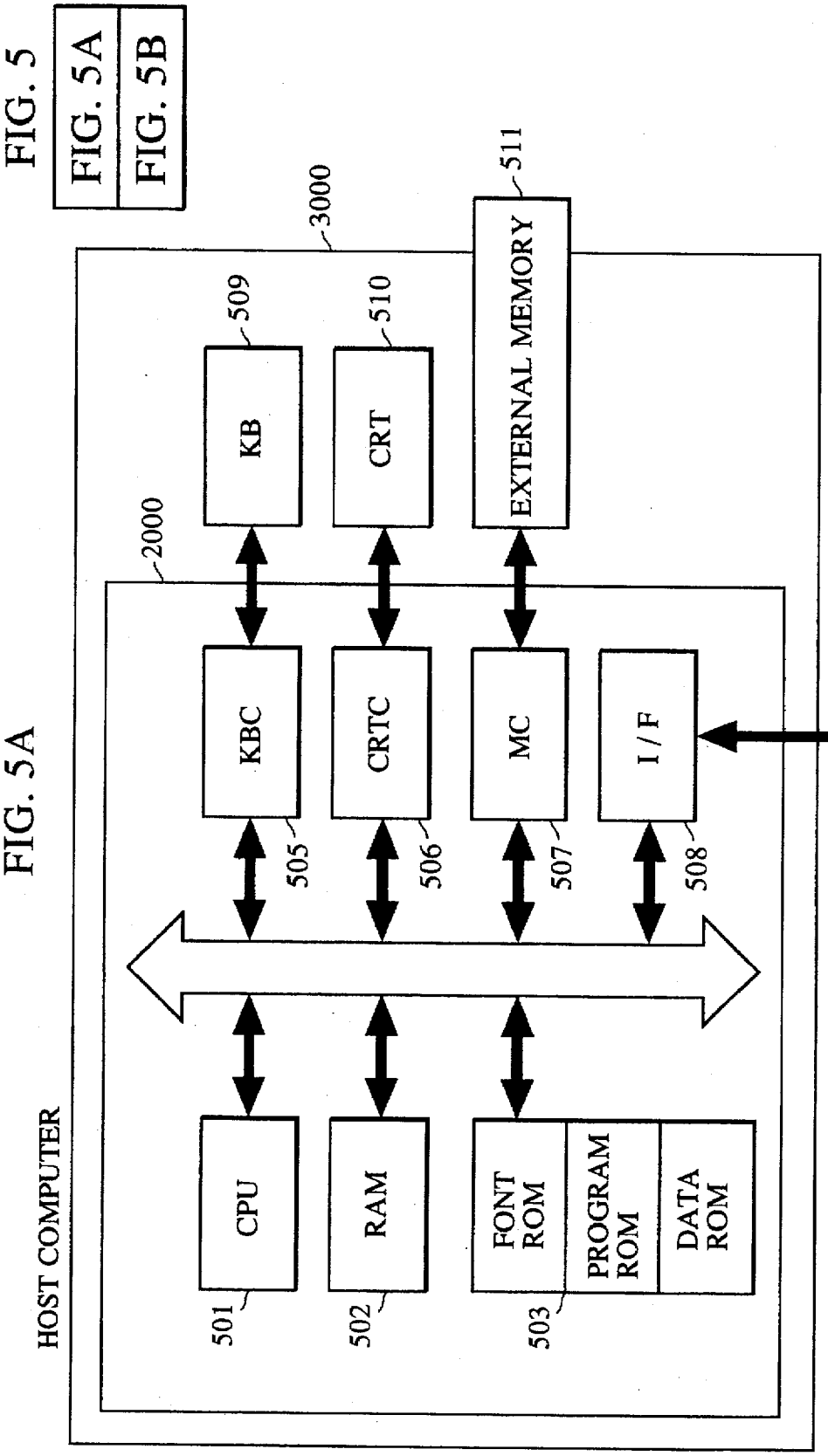

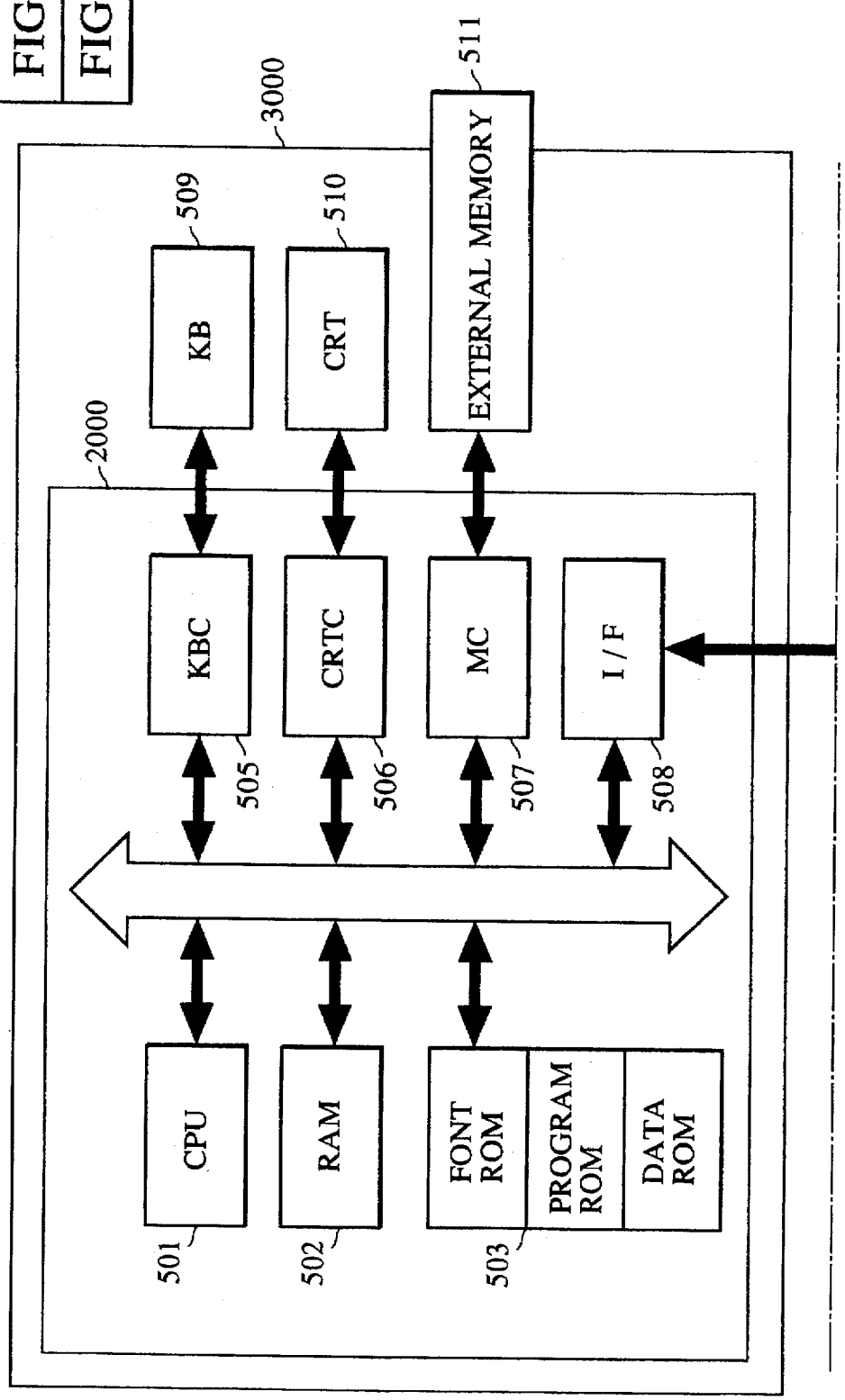

FIG. 10A

```
┌─────────────────────────────────────────────┐
│ −  │              PRINT                     │
├────┴────────────────────────────────────────┤
│ ○ PRINTER :                       [ PRINT ] │
│ ○ COPIES :          [   1  ]      [ CANCEL ]│
│ ○ PAPER FEED MODE : [MP TRAY] ○ SIZE [UNIVERSAL]│
│                                             │
└─────────────────────────────────────────────┘
```

FIG. 10B

```
┌────┬──────────────────┐
│ −  │ PAPER FEED MODE  │
├────┴──────────────────┤
│ ○ AUTO                │
│ ○ CASSETTE            │
│ ◉ MP TRAY             │
└───────────────────────┘
```

FIG. 10C

```
┌────┬──────────────┐
│ −  │   MP TRAY    │
├────┴──────────────┤
│ ○ A4              │
│ ○ B5              │
│ ○ LETTER          │
│ ○ LEAGAL          │
│ ◉ UNIVERSAL       │
└───────────────────┘
```

FIG. 10D

```
┌──────────────────────────────────────────────┐
│  ┌────────────────────────┐    [ REPRINT ]   │
│  │ PAPER SIZE DOES NOT    │    [ CANCEL  ]   │
│  │ MATCH. FOR REPRINT.    │                  │
│  │ SET A4 PAPER ON THE    │                  │
│  │ MP TRAY AND CLICK      │                  │
│  │ [REPRINT].             │                  │
│  └────────────────────────┘                  │
└──────────────────────────────────────────────┘
```

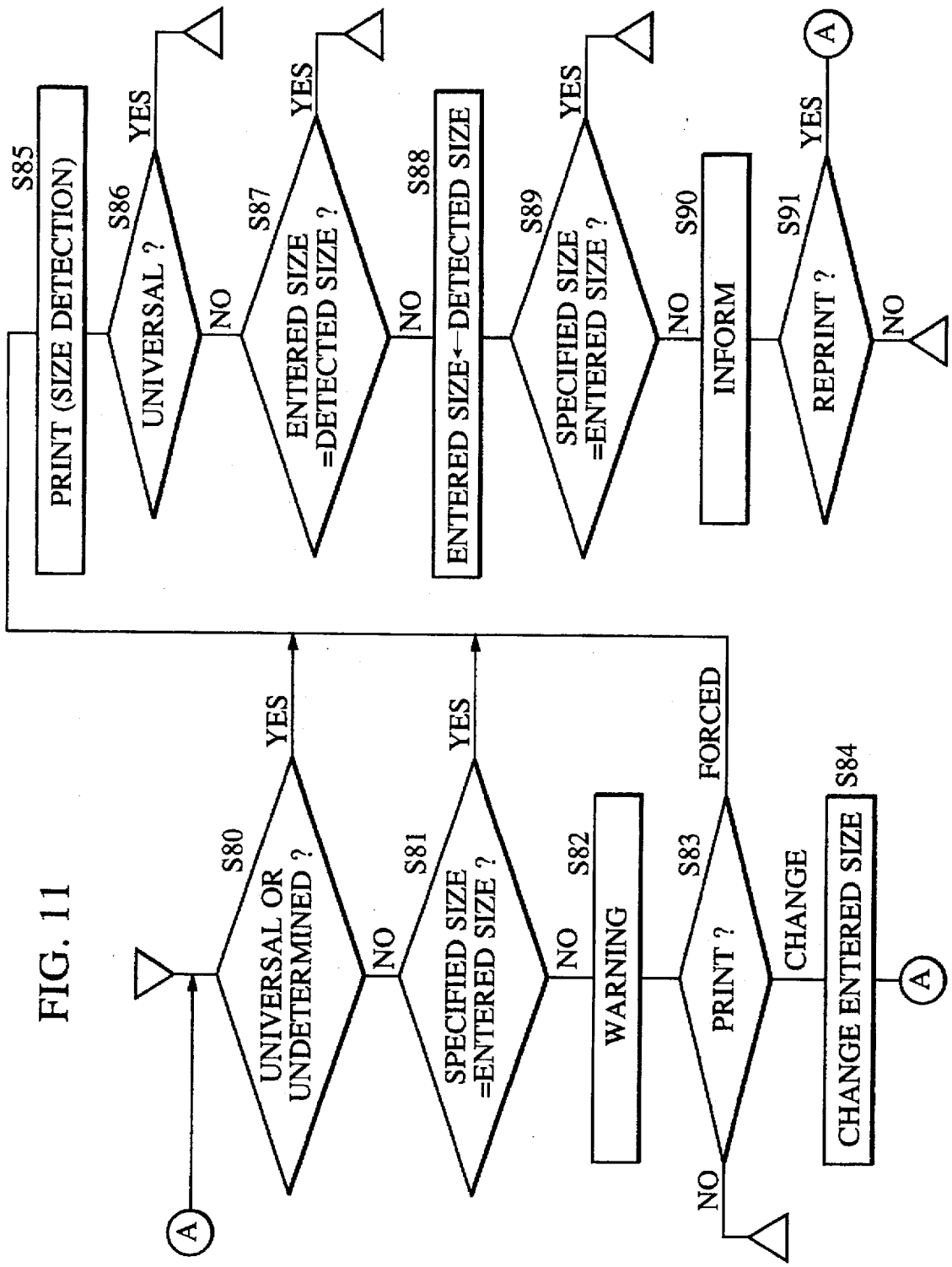

PRINTING APPARATUS WITH MEANS OF COMPARING PAPER SIZE SPECIFIED BY AN EXTERNAL APPARATUS WITH A CALCULATED PAPER SIZE

BACKGROUND OF THE INVENTION

1. Field of the Invention

The present invention relates to a printing apparatus which is connected to and used in conjunction with a host computer or the like and a method of controlling such printing apparatus.

2. Description of the Related Art

Hitherto, in this type of printing apparatus, an apparatus has been known which detects the size of printing paper set in a paper cassette. But an apparatus without having a dedicated mechanism for detecting the size of the paper is also widely used.

In such a printing apparatus which does not have a dedicated mechanism for detecting the size of the paper, pre-entered paper size information is stored therein. Prior to printing, the paper size information is compared with paper size information reported in the form of a command from a host apparatus; if such information does not match, a warning is displayed on an operation panel or the like without starting printing in order to make a request for replacing the paper.

However, the aforesaid entered paper size information is set presuming one paper size will be used most, or set pursuant to a setting operation by an operator. Even in the latter case, there are cases where the entered paper size information may not match the size of the paper which is actually set due to a mistake by, or the forgetfulness of, the operator. Therefore, in practice, even in a case where the paper size specified by a command from a host apparatus matches the mounted paper size, an erroneous warning display is made when the entered paper size is different from the mounted paper size.

If the size indicated by the host computer matches the entered paper size, a desired printing result cannot be obtained if the entered paper size does not match the size of the sheet which is actually set.

Even in a printing apparatus which can detect the size of sheets in a paper cassette, if a multi-purpose tray (MP tray) or a universal tray capable of mounting sheets of various sizes is also provided in such a printing apparatus, it is difficult to recognize the size of the sheets when they are fed from such a tray.

Therefore, the above-described problem occurs in such a printing apparatus.

A method of calculating the size of the paper by measuring the time for passing through the printing paper to be fed by means of a sensor disposed in a feeding passage is conceivable. In the above-described method of detecting the size of the paper while the sheet is being fed, since the printing operation has generally already started when the size of the sheet is detected, it is not possible to warn an operator before printing.

Even if the entered size of the paper does not match the paper set to be used, it is conceivable that printing still is to be performed by an operator instructing the host apparatus to continue the printing operation. However, the operation by the operator for indicating the continuation of printing must be manually performed, thus a smooth operation is impeded. That is, an erroneous warning display may cause the operator to be confused, and an operation for inspecting the set paper may be performed, which is inconvenient.

SUMMARY OF THE INVENTION

It is an object of the present invention to solve the above-described problems.

It is another object of the present invention to improve the ease of operation and convenience of a printing apparatus.

It is a further object of the present invention to improve the ease of operation and convenience of a printing apparatus which cannot detect the size of recording paper mounted in an MP tray or the like.

It is a still further object of the present invention to provide a printing apparatus which does not display a warning about a mismatch in paper size in the case where the paper size indicated matches the size of paper which is actually set, or which does not request an operator to perform a complex operation.

It is a still further object of the present invention to provide a printing apparatus capable of obtaining a desired printout even if the size of sheets housed in the housing means cannot be recognized beforehand.

It is a still further object of the present invention to provide a printing apparatus capable of informing a print data source of the size of sheets even if the size of the sheets housed in housing means cannot be recognized beforehand.

It is a still further object of the present invention to provide a printing apparatus having high ease of operation without displaying a useless display when the entered paper size held by a printing apparatus does not match the size of the mounted paper which is actually set and the paper size specified by a host apparatus.

According to a preferred embodiment of the present invention, there is provided a printing apparatus, including measuring means for measuring an elapsed time for feeding a sheet of paper from its top edge to its bottom edge by feeding a first paper; paper size calculating means for calculating a paper size on the basis of the measured time and the paper feeding rate which is determined by the printing apparatus; calculated result transmitting means for transmitting the paper size calculated by the calculating means and informing an operator of the paper size; comparing means for comparing the paper size calculated by the calculating means with the paper size specified by an external apparatus; size setting means for setting within the printing apparatus the calculated paper size as a specified paper size for printing a second and later sheets when the above comparison indicates that both sizes match each other; display means for displaying a mismatch of the paper size in order to inform an operator of the mismatch when the above comparison indicates that the paper sizes do not match each other; and reprint control means for reprinting the page after the operator replaces the paper.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIGS. 5A, 5B, 6, 7A, and 7B are block diagrams illustrating electrical arrangements in accordance with a second embodiment of the present invention;

FIGS. 10A to 10D show examples of display on a CRT 510; and

FIGS. 11 and 12 are flowcharts of processing in the second embodiment of the present invention.

DETAILED DESCRIPTION OF THE PREFERRED EMBODIMENTS

Preferred embodiments of the present invention will be described below with reference to the accompanying drawings.

[First Embodiment]

Figure 1:
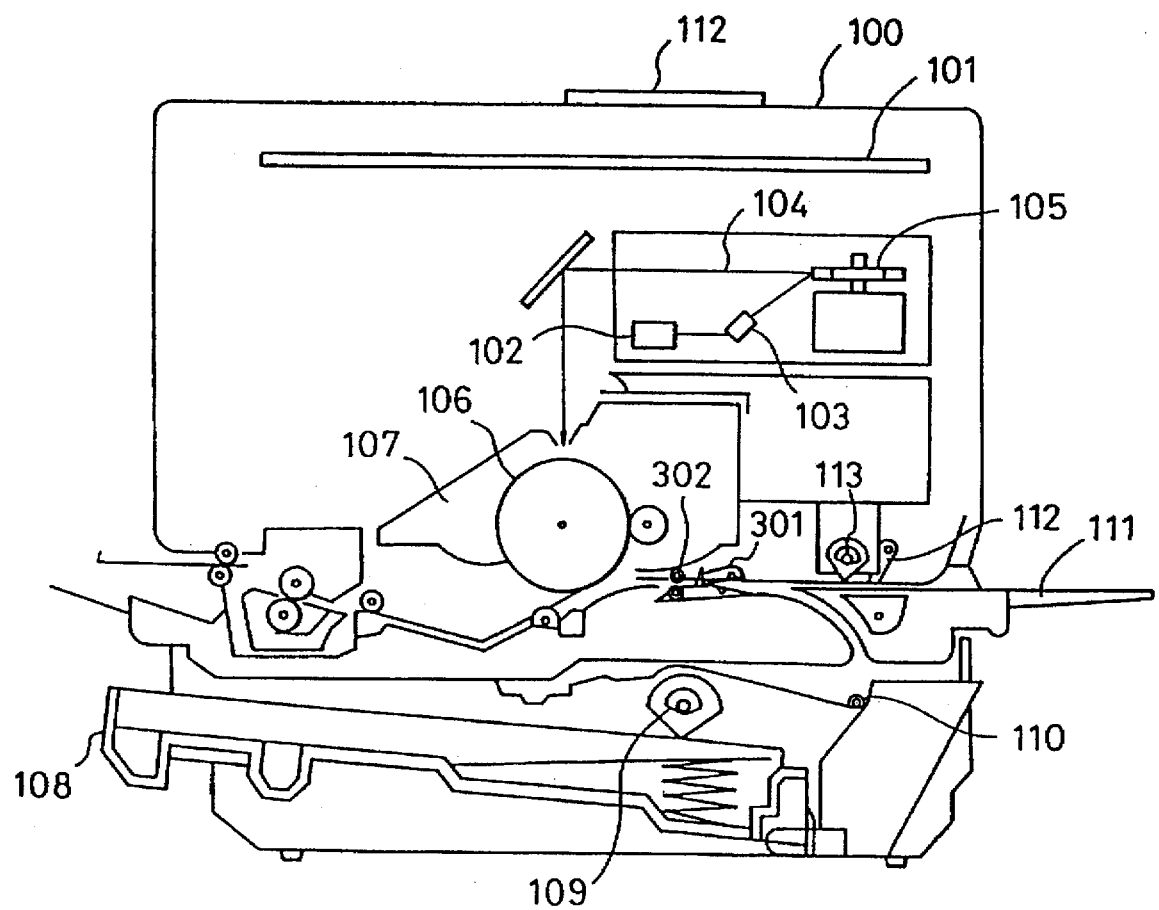
FIG. 1 is a schematic sectional view illustrating the construction of an LBP (Laser Beam Printer) apparatus in accordance with a first embodiment of the present invention.

FIG. 1 is a schematic sectional view illustrating a laser beam printing apparatus (hereinafter referred to as an LBP) serving as a printing apparatus in accordance with a first embodiment of the present invention.

An LBP unit 100 is connected to an external apparatus, such as a host computer, and performs printing on the basis of print data, such as control codes and character codes, sent from the host computer or the like. An operation panel 112 has switches for various operations, an LED display device and the like.

A printing apparatus control unit 101 controls the entire LBP unit 100 and analyzes control codes and character codes supplied from a host computer. The printing apparatus control unit 101 mainly analyzes data from the an external apparatus and then expands drawing data on a memory, converts the data into video signals and outputs the signals to a laser driver 102.

The laser driver 102 is a circuit for driving a semiconductor laser 103 and switches laser light 104 emitted from the semiconductor laser 103 on or off according to an input video signal. The laser light 104 is deflected from side to side by a rotary polygon mirror 105 in order to scan an electrostatic drum 106, thereby forming an electrostatic latent image of a drawing pattern on the electrostatic drum 106. This latent image is developed by a development unit 107 in the neighborhood of the electrostatic drum 106, after which the latent image is transferred to recording paper.

The recording paper is housed in a paper cassette 108 mounted in the LBP unit 100, taken into the apparatus by paper feeding rollers 109 and transport rollers 110 and 111, and then supplied to the electrostatic drum 106. Reference numeral 301 denotes a sensor for detecting the presence or absence of paper being fed and reference numeral 302 denotes a registration roller.

Reference numeral 111 denotes a multi-purpose tray (MP tray) in which recording paper of any desired size can be housed (mounted); reference numeral 112 denotes a sensor for detecting whether recording paper is mounted in the MP tray 111; reference numeral 113 denotes a paper feeding roller for feeding recording paper mounted in the MP tray 111 one by one. In this embodiment, the LBP unit 100 does not have means for recognizing the size of recording paper mounted in the MP tray 111.

The present invention may preferably be applied to a case in which the size of recording paper housed in such MP tray 111 cannot be recognized. Therefore, the present invention may preferably be applied to a case in which recording paper of a desired size is housed in the paper cassette 108, for example, a universal cassette, and the size of the recording paper housed cannot be recognized by the LBP unit 100. Also, the present invention may preferably be applied to an LBP in which different paper cassettes are mounted for each size of the recording paper to be housed.

Figure 2:
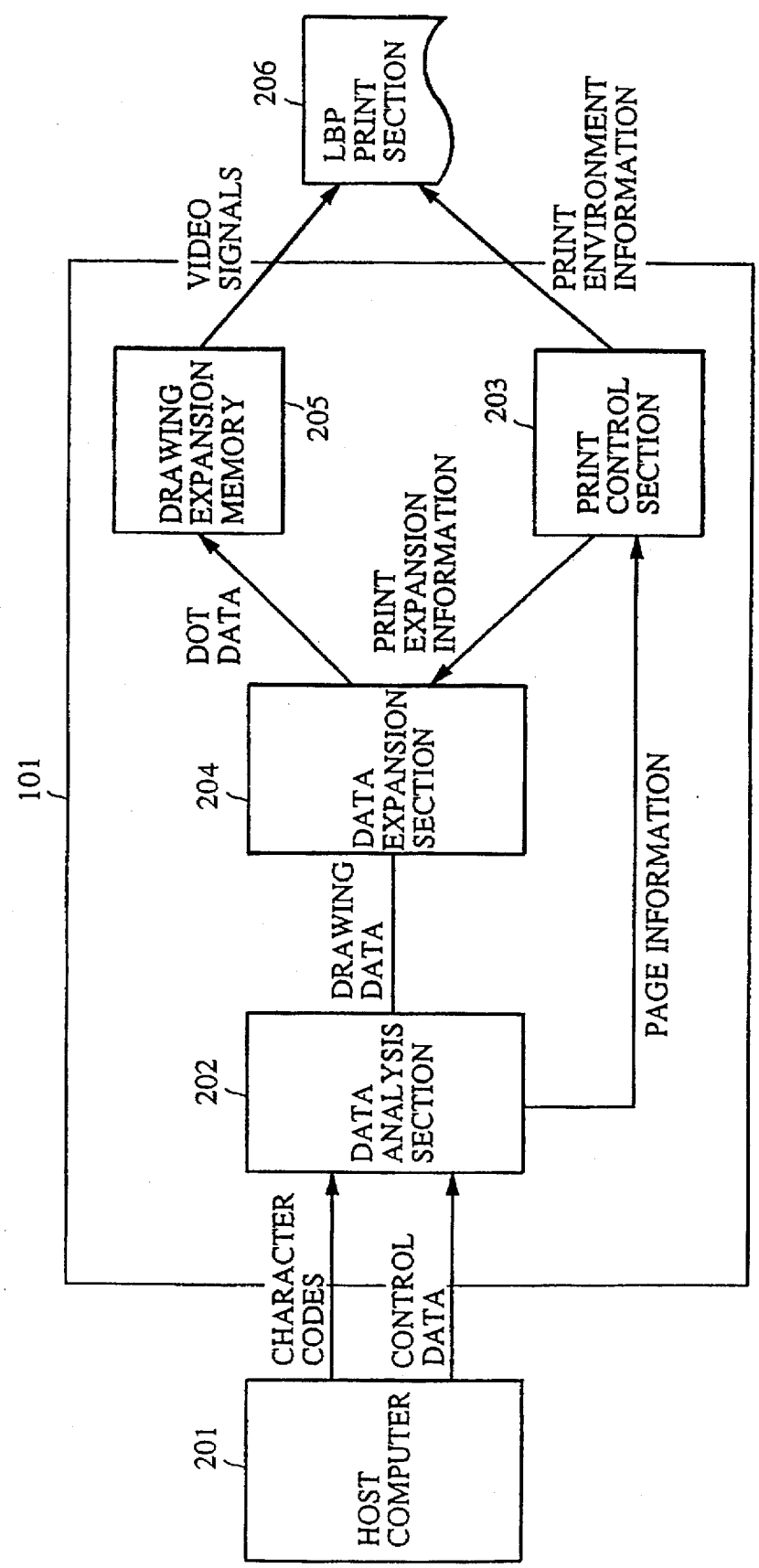
FIG. 2 is a block diagram illustrating the schematic construction of a control system of the LBP in accordance with the first embodiment of the present invention.

FIG. 2 is a block diagram illustrating the schematic construction of the control system 101 of the LBP shown in FIG. 1.

In FIG. 2, data formed of control codes and character codes sent from a host computer 201 which is a source where printing information is generated is input, and a data analysis section 202 creates page information and drawing data on the basis of various information sent from the host computer 201.

A print control section 203 sends print expansion information, such as a size or a margin by which dot data is formatted on the basis of the page information obtained from the data analysis section 202 to a data expansion section 204 and sends paper feeding outlet and paper size print environment information to an LBP printing section 206.

The data expansion section 204 creates dot data on the basis of the drawing data obtained from the data analysis section 202 and the print expansion information obtained from the print control section 203, and stores the data in a drawing expansion memory 205. The LBP printing section 206 is a print mechanism section of the LBP which obtains print environment information from the print control section 203 and video signals from the drawing expansion memory 205, and prints image information on the basis of these video signals.

Figure 3:
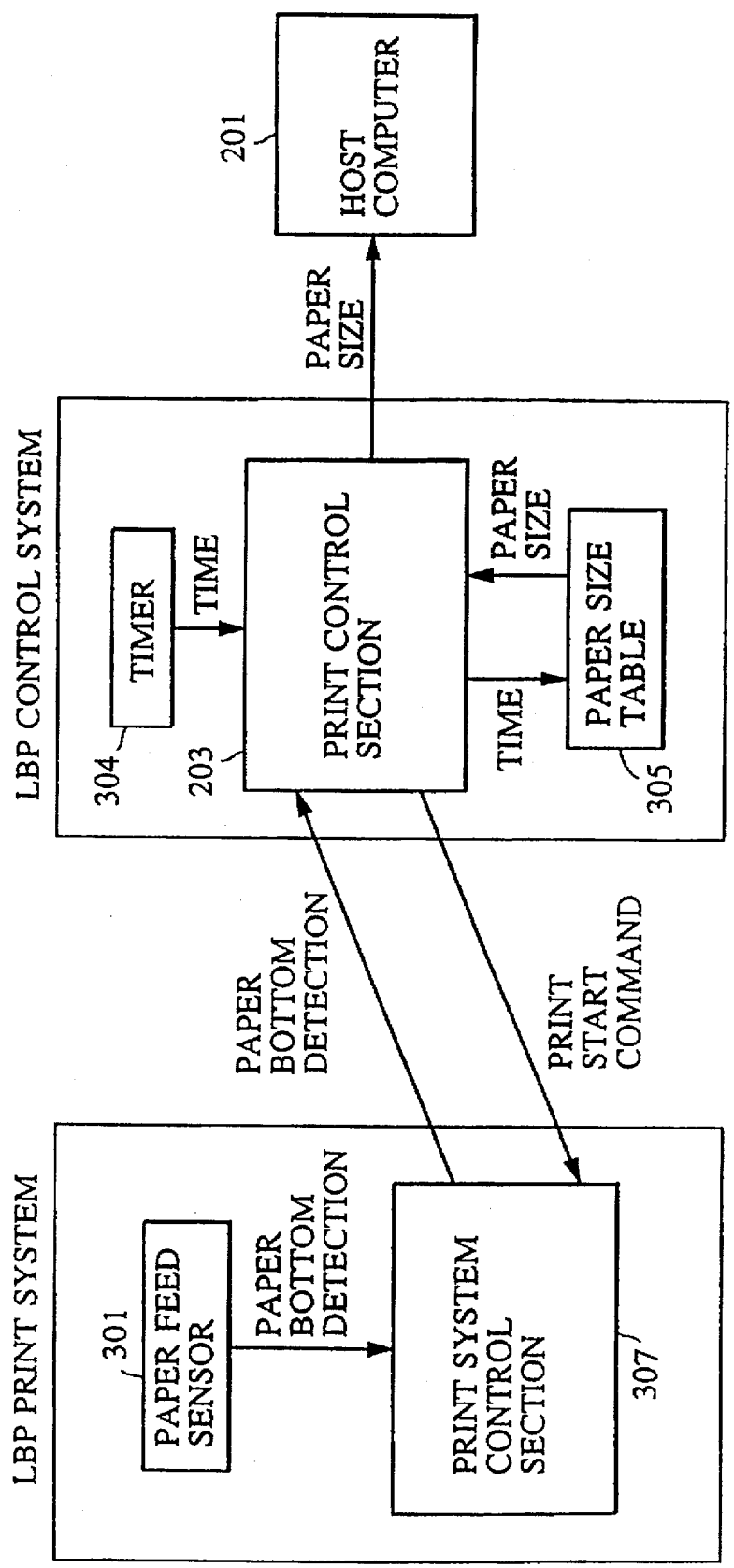
FIG. 3 is a block diagram illustrating a paper size calculating processing section in accordance with the first embodiment of the present invention.

FIG. 3 is a block diagram illustrating a paper size calculating processing section in accordance with the first embodiment of the present invention.

A paper feed sensor 301 of the LBP print system is a sensor for detecting the top edge and bottom edge of the paper and sends information to a print system control section 307. The print system control section 307 receives a print start command, a paper size and the like from a print control section 203 of the LBP control system, and informs the print control section 203 of the detection of the bottom edge of the paper.

A timer 304 is a timer incorporated in the LBP control system. A paper size table 305 is a table in which a paper feeding time and paper sizes, both of which are determined by the LBP print system, are written. The print control section 203 refers to the paper size table 305 on the basis of the time from the top edge of the paper to the bottom edge and sends the paper size to a host computer 201.

The time at which a print start command from the print control section 203 of the LBP control system is received by the print system control section 307 of the LBP print system is assumed to be the time the top edge of the paper is detected, and the time at which the print control section 203 of the LBP control system recognizes that the bottom edge of the paper is detected by the paper feed sensor 301 of the LBP print system is assumed to be the time the bottom edge of the paper is detected.

Figure 4:
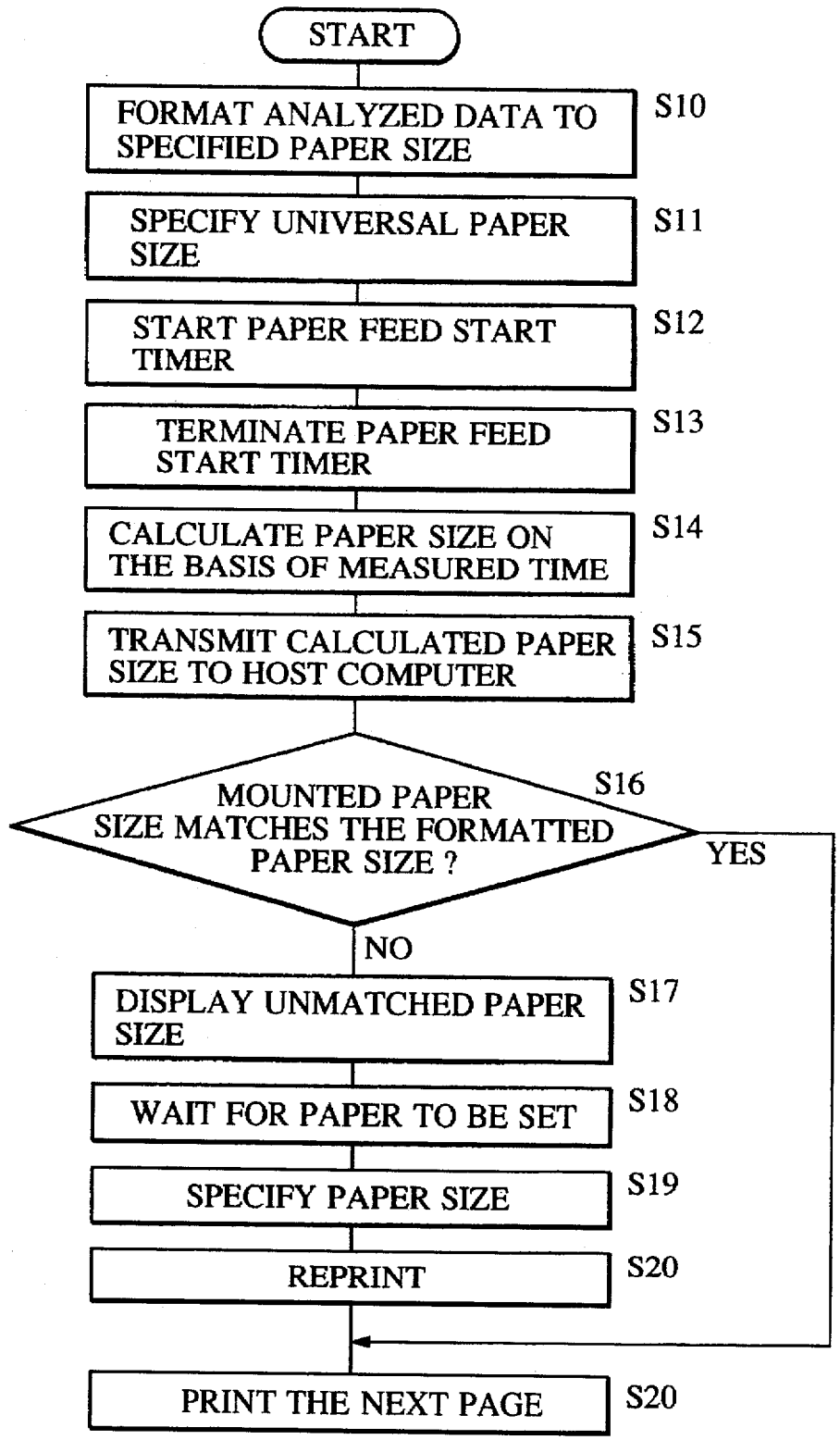
FIG. 4 is a flowchart illustrating a control operation in accordance with the first embodiment of the present invention.

FIG. 4 is a flowchart illustrating a method of calculating a paper size and a control method in a printing apparatus having no paper size detecting mechanism in this embodiment.

In step S10, data is formatted to the paper size specified by the operator. Next, in step S11, specification of a universal paper size is sent to the LBP printing section 206. The specification of the universal paper size makes it possible to increase the detection time of the paper feed sensor 301 of the LBP print system and to cope with all the sizes.

In step S12, a timer incorporated inside the LBP control system is started at the same time a print start command is sent from the LBP control system to the LBP print system. It is assumed that the top edge of the paper is already at the position of the paper feed sensor when the print command is issued, and the paper is fed after the print command is issued.

When the paper feed sensor 301 of the LBP print section 206 detects the bottom edge of the paper, the paper bottom edge detection is sent to the print control section 203 of the LBP control system. In step S13, the print control section 203 terminates the timer. In step S14, the elapsed time for feed the paper from its top edge to its bottom edge is calculated, and the mounted paper size is obtained on the basis of the paper feeding time table determined by the printing apparatus incorporated inside.

Then, in step S15, the obtained paper size is sent out to the host computer 201 in order to inform the operator of the mounted paper size. If the paper size requested by the operator matches the mounted paper size in step S16, the process proceeds to step S21 where the next page is printed. For the next and later pages, the paper size obtained for the first page is specified in the LBP print section 206.

If the paper size requested by the operator does not match the mounted paper size in step S16, the process proceeds to step S17 where a mismatch in paper size is reported to the operator via a display on the host computer and the operation panel. In step S18, a request for replacing the paper is made, and waiting for the paper specified by the operator to be set occurs. In step S19, the paper size specified by the operator is sent to the LBP printing section 206, and this page is reprinted in step S20.

In this way, when the size of the paper which is actually set matches the paper size indicated by the operator, it is possible to smoothly perform a printing operation as in the prior art regardless of the paper size which is initially set in the printing apparatus.

Since in this embodiment a universal paper is specified in the LBP print system during test print and printing is performed, it becomes possible to accurately know the mounted paper size information.

Although in this embodiment paper size specification of universal paper for the first paper is sent to the LBP control system, the paper size specified by the operator may be sent thereto. In this case also, if the formatted paper size is different from the mounted paper size, a warning about a mismatch in paper size or paper jamming will be given to the operator.

According to the present invention, as described above, printing becomes possible without performing a manual operation by the operator in a printing apparatus having no paper size detecting mechanism, and the size of mounted paper can be obtained without performing a manual operation by the operator.

[Second Embodiment]

A second embodiment of the present invention will be explained below. The components in FIG. 1 are the same as those of this embodiment, and thus an explanation thereof is omitted here.

FIG. 5 is a block diagram illustrating an electrical arrangement of the second embodiment of the present invention. Reference numeral 3000 denotes a host computer which incorporates a CPU 501 therein and which performs document processing and various information processings for pictures, images, characters and tables (including table calculation) on the basis of document processing programs stored in a program ROM 503. Font data used for the document processing is stored in a font ROM, and various data required for the information processing is stored in a data ROM. Reference numeral 502 denotes a RAM which works as the main memory, a work memory or the like for a CPU 501. Reference numeral 505 denotes a keyboard controller (KBC) which controls an input from a keyboard 509 and a pointing device, such as a mouse (not shown); reference numeral 506 denotes a CRT controller (CRTC) which controls the display of a CRT display (CRT) 510; reference numeral 507 denotes a memory controller (MC) which controls the access to an external memory 511, such as a hard disk (HD) or floppy disks (FD) for storing various application software, user files, edition files and the like; and reference numeral 508 denotes a printing apparatus I/O controller which is connected to a printing apparatus 100 and which controls a general-purpose bidirectional interface.

In the printing apparatus 100, reference numeral 512 denotes a printing apparatus CPU which centrally controls various devices connected to a system bus 515 on the basis of control programs stored in a program ROM of a ROM 513. Font data or the like used when output information is created is stored in the font ROM of the ROM 513, and various data is stored in a data ROM of the ROM 513. The CPU 512 is able to communicate with the host computer via an input/output section 518 and is constructed to inform the host computer 3000 of the information inside the printing apparatus 100. Reference numeral 519 denotes a RAM which works as the main memory, a work area or the like for the CPU 512 and is constructed in such a way that the memory capacity can be expanded using an optional RAM connected to an expansion port (not shown). The RAM 519 is used for an output information expansion area, an environment data storage area, an NVRAM (nonvolatile RAM) or the like. The access to the external memory 514, the hard disk (HD) or an IC card is controlled by a memory controller (MC) 520. The external memory 514 is removably connected and stores font data, emulation programs, form data and the like. Reference numeral 518 denotes an operation panel on which switches for operations, LED display devices and the like are disposed.

Figure 6:
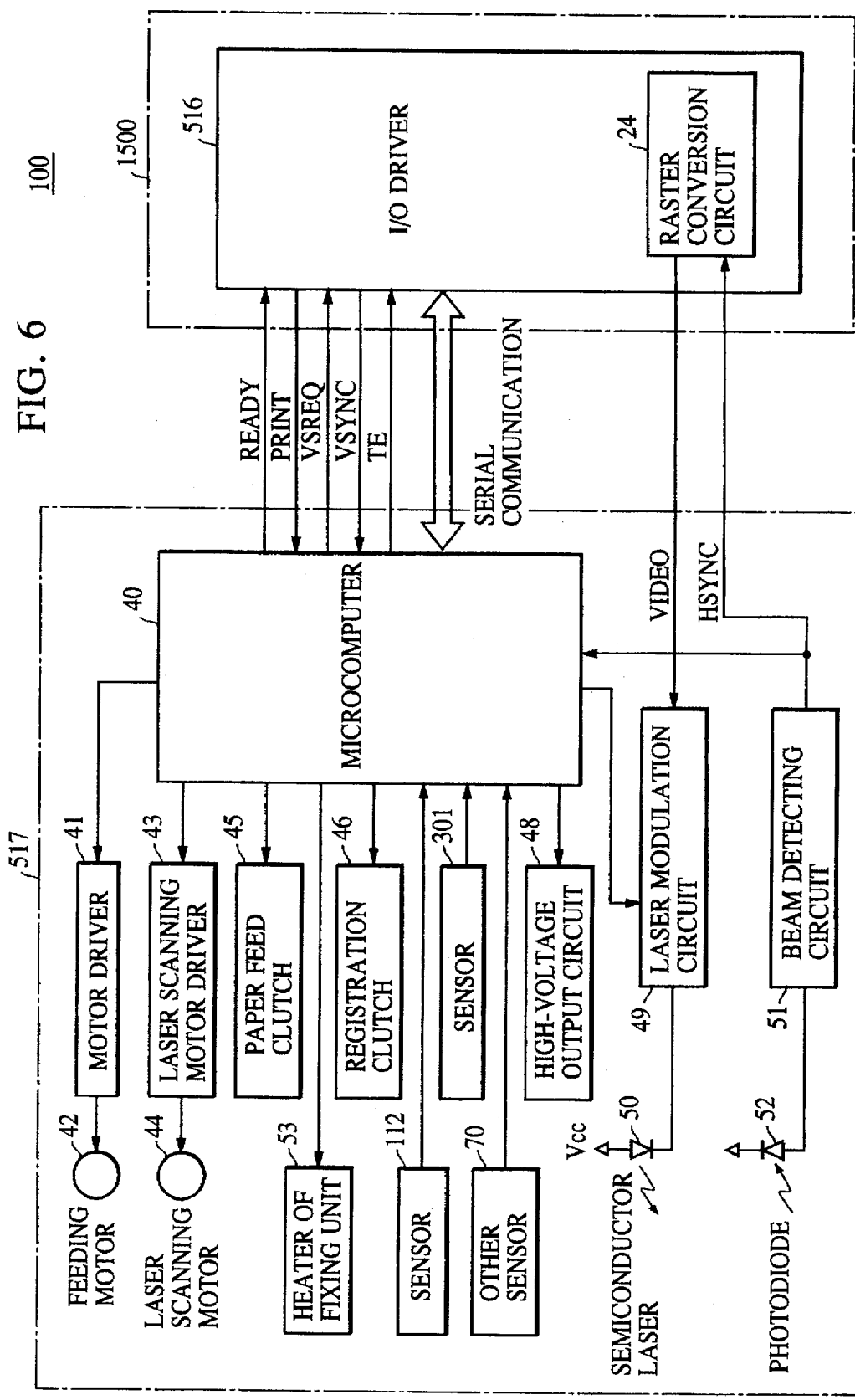

Next, referring to FIG. 6, the mechanical control of the laser unit 100 is performed by a microcomputer 40. The loads of the microcomputer 40 include a motor driver 41, a laser scanning motor driver 43, a paper feeding clutch 45, a registration clutch 46, sensors 112, 301 and 70, a high-voltage output circuit 48, a laser modulation circuit 49, and a beam detecting circuit 51.

The microcomputer 40 controls those loads in accordance with an instruction from an I/O driver 516. A READY signal, a PRINT signal, a VSREQ signal, a VSYNC signal or the like are transmitted and received between the microcomputer 40 and the I/O driver 516. In addition, serial communication lines are available for informing the I/O driver 516 of the state of the load of the printing apparatus and informing the microcomputer 40 of an instruction from the I/O driver 516.

Image signals (VIDEO signals) output from a raster conversion circuit 24 are input to a laser modulation circuit 49, and laser light output from a semiconductor laser 50 is modulated in accordance with the video signals. The laser light is scanned by a laser scanning mirror as described earlier. The scanned laser light enters a photodiode 52 disposed in the scanning passage for the laser light. The laser beam is converted into pulse signals by the beam detecting circuit 51. The pulse signals output from the beam detecting circuit 51 are input as a horizontal synchronization signal (HSYNC signal) to the raster conversion circuit 24.

Figure 7B:
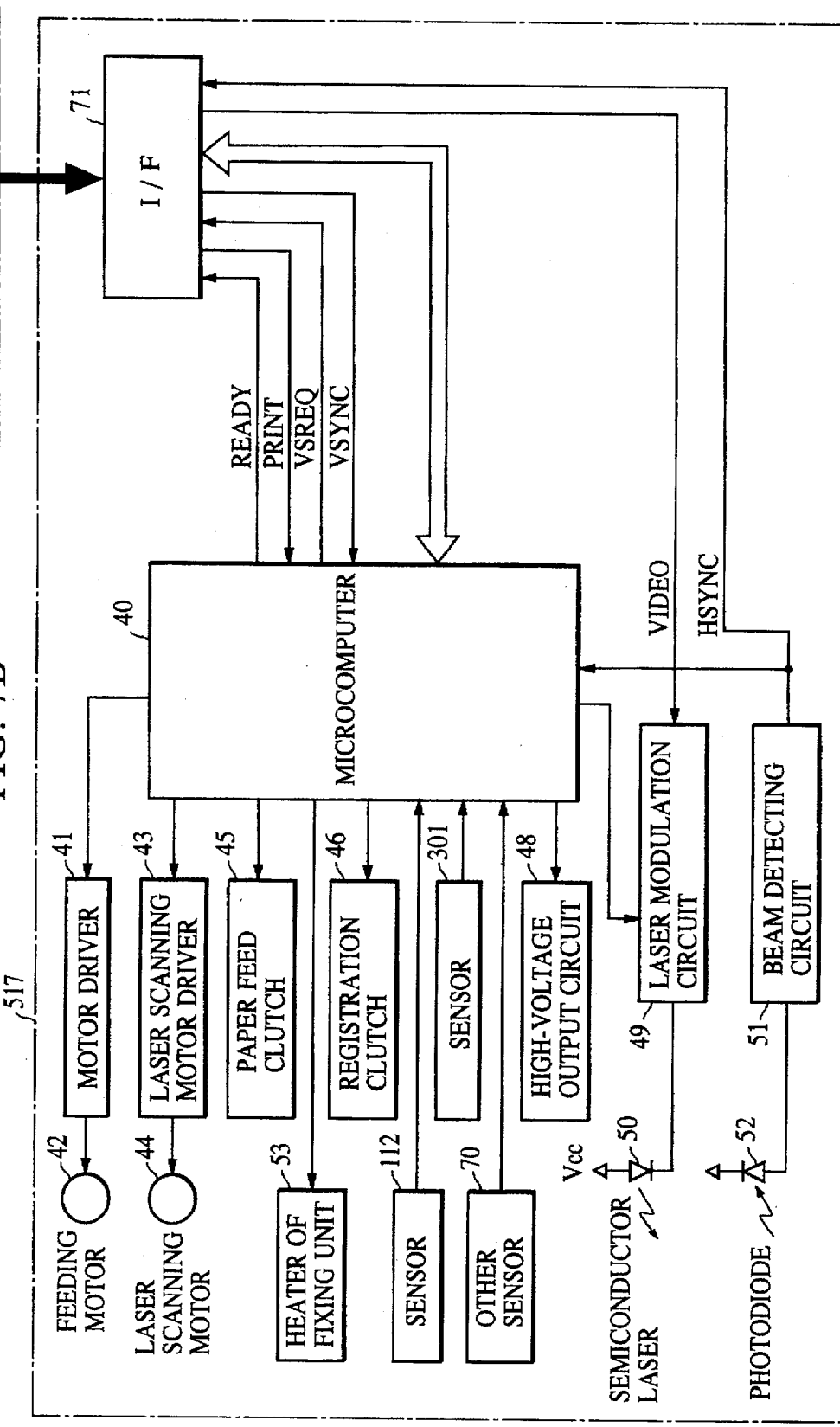

FIG. 7 shows the construction of this embodiment when rasterizing is performed inside the host computer. Components in FIG. 7 which are the same as those in FIG. 6 are given the same reference numerals, and an explanation thereof is omitted. FIG. 7 differs from FIG. 5 and FIG. 6 in that the CPU 501 inside the host computer 3000 develops (rasterizes) bitmap data to be printed into a RAM 502, and the I/F 508 sends such bitmap data, by commands to be described later and the like to an I/F 71 in conformity with a protocol of a general-purpose interface, such as SCSI. The I/F 71 converts the data in the format of a general-purpose I/F protocol into data of a video I/F format.

Next, the operation of the second embodiment will be described with reference to the construction of FIG. 7.

Figure 5B:
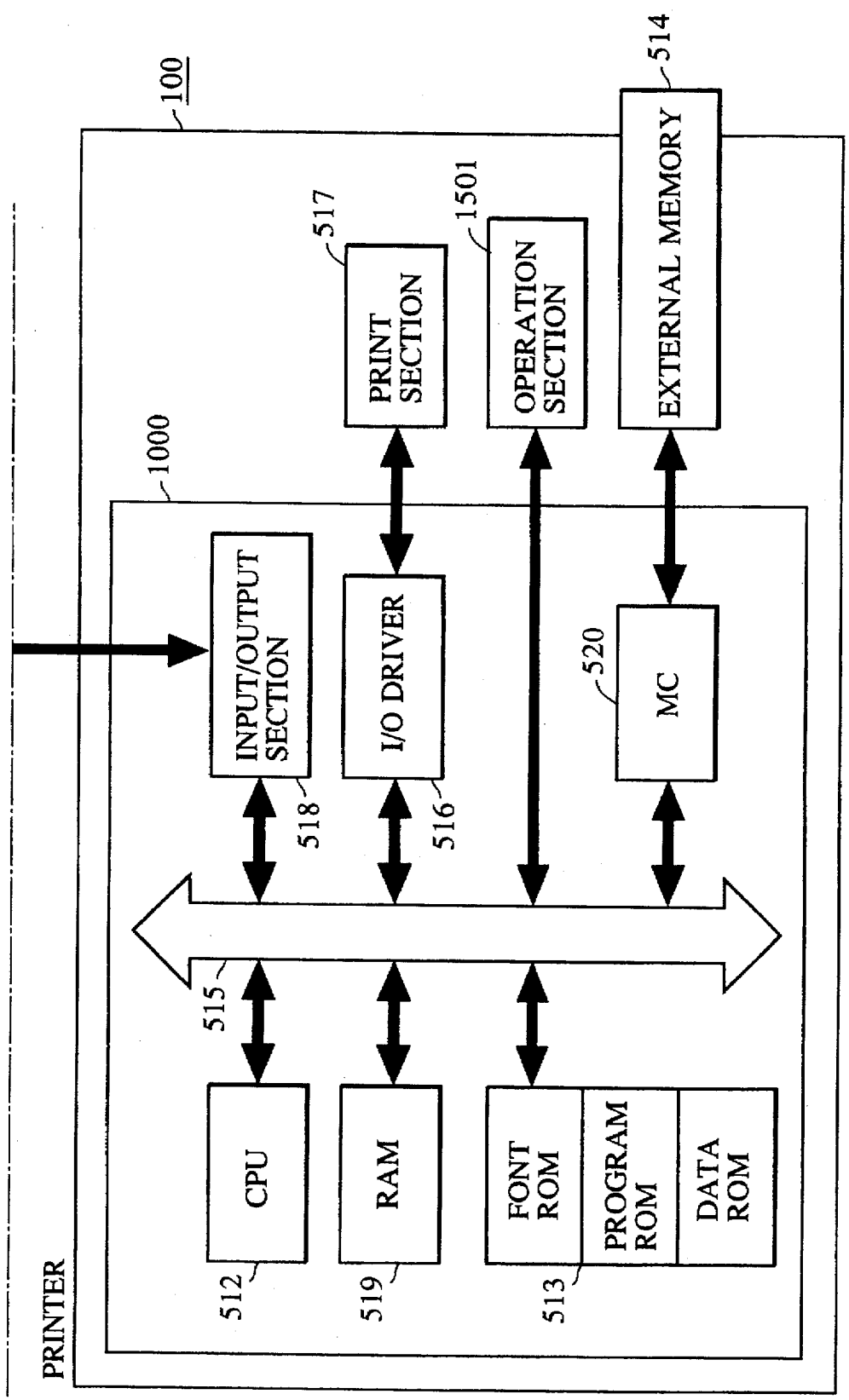

The construction in FIGS. 5 and 6 is the same as that in FIG. 7 except that in FIGS. 5A, 5B, and 6, data input by an operation in the host computer 3000 and data displayed on an CRT 510 are communicated via the I/F 508 and the input/output section 518, operations corresponding to such data are performed by the CPU 512 rather than the CPU 501, and data input by an operation in the host computer 3000 may be input by operating an operation section 1501. Therefore, an explanation is omitted unless otherwise necessary.

(1) Setting of paper feed mode

The recording apparatus of this embodiment has a mode in which recording paper is fed from the paper cassette 108 and printing is performed, and a mode in which recording paper is fed from the MP tray 111 and printing is performed.

An operation for setting the paper feed mode in the host computer 3000 will now be described with reference to FIGS. 10A and 10B. Initially, when an operator selects "PRINT" by using a pointing device, such as a mouse, a window shown in FIG. 10A appears on the display screen of the CRT 510. When "PAPER FEED MODE" in the window is selected, a window shown in FIG. 10B appears. The operator selects a desired mode on this window. An "AUTO" mode is a mode in which printing paper is fed from housing means corresponding to the specified size from among entered sizes (described later) of the MP tray and paper sizes housed in the cassette.

Figure 8A:
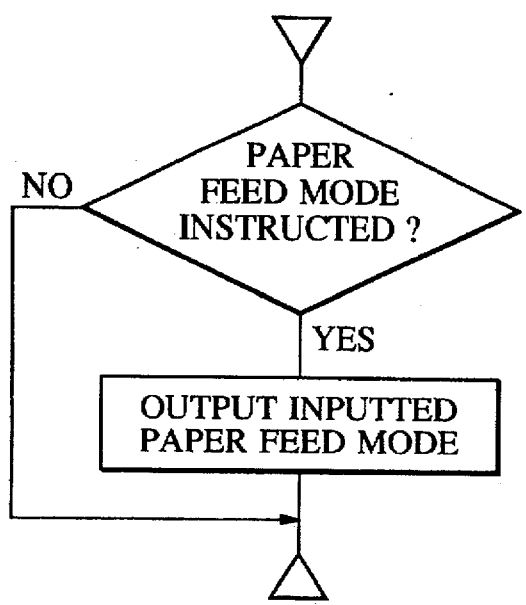
FIGS. 8A to 8C are flowcharts illustrating an operation for setting a paper feeding mode and an entered size by a CPU 501.

Referring to FIG. 8A, when the paper feed mode is indicated by the aforesaid operation, a command specifying the indicated paper feed mode is output via the I/F 508. In the case of the "AUTO" mode, a command specifying either the cassette mode or the MP tray mode is output.

When the paper feed mode set by this command is an MP tray mode, the microcomputer 40 makes the paper feeding roller 113 rotate in response to the PRINT signal, causing printing paper to be fed from the MP tray 111. When the paper feed mode is a cassette mode, the microcomputer 40 makes the paper feed roller 109 rotate in response to the PRINT signal, causing printing paper to be fed from the paper cassette 108.

(2) Setting of entered sizes corresponding to the MP tray

Figure 8B:
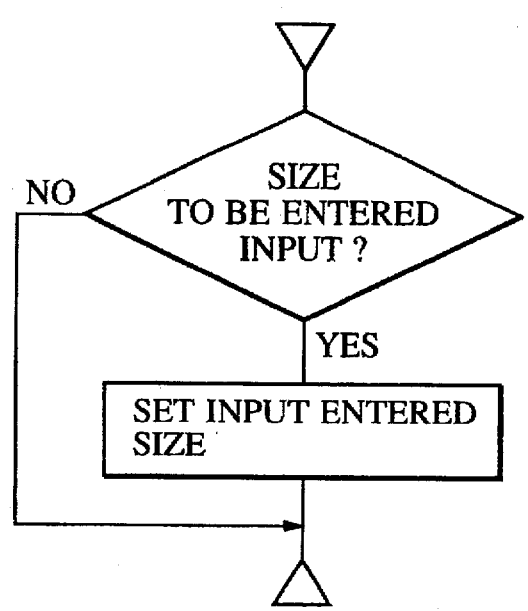

In this embodiment, when the MP tray mode has been set, sizes of paper to be housed in the MP tray are set as entered sizes. When a tray mode is selected on the window shown in FIG. 10B, a window shown in FIG. 10C appears, and the entered size may be input (FIG. 8B).

In this embodiment, in addition to paper sizes (e.g., A5, B5, legal, or letter) usable in this printing apparatus, "universal" may be set. Since in this embodiment the entered size can be automatically set as will be described later, it does not necessarily require that the entered size be input by the operator.

Figure 8C:
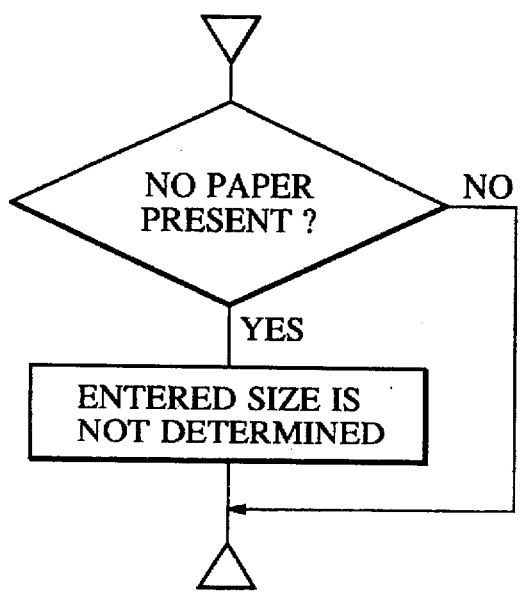
Figure 9:
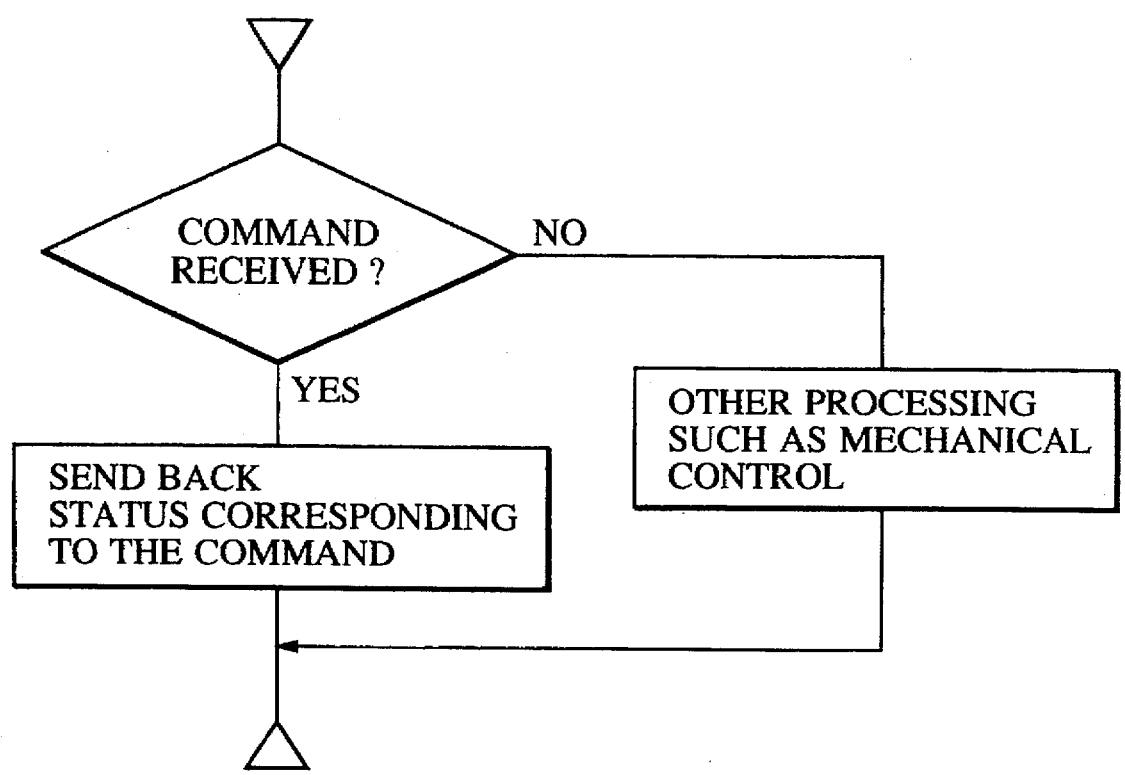
FIG. 9 is a flowchart illustrating an operation for sending back a status in response to a received command by a microcomputer.

When the sensor 112 detects that there is no paper in the MP tray 111, the READY signal is turned off. The CPU 501, in response to the above, sends a predetermined inquiry command to the microcomputer 40 via the I/F 508, and the microcomputer 40, in response, sends back a status to the fact that there is no paper (FIG. 9). The CPU 501 recognizing the absence of paper according to this status sets the entered size at "undetermined" (FIG. 8C).

(3) Warning before printing

In a case where printing is performed using print data sent from the host computer 3000, when the size (usually specified by a size specification command included in the print data, hereinafter referred to as a specification size) of paper on which an image specified by print data should be recorded does not match the aforesaid entered size (S81 in FIG. 11), a buzzer is sounded or a mismatch is displayed on the CRT 50 (FIG. 7) or on the display section of the operation section 1501 (FIGS. 5 and 6) in order to give a warning to that fact (S82). However, when "universal" has been set, printing is performed without giving such warning (S80 in FIG. 11).

When the above warning is given, the printing apparatus is placed in the offline state (FIGS. 5 and 6) and waits for an operation to be performed by the operator. In response to this situation, the operator may perform one of the following by operating the keyboard 509:

① changes the entered size to the specified size and performs printing (online)

② printing is forcedly performed even if a mismatch in paper size occur (error skip)

③ abandon printing based on the received print data (4) Detection of paper size (S85 in FIG. 11)

A method of detecting paper size in this embodiment will be described below.

The top edge of the printing paper fed from the MP tray 111 in response to the PRINT signal is detected by the sensor 301, butts the registration roller 302 and is stopped. In this condition, the microcomputer 40 outputs a VSREQ signal. Thereafter, when the CPU 301 determines that image data to be output in a bitmap format is ready, image data (video signals) are output together with a signal for making a VSYNC signal for driving the registration roller 302 output from the I/F 71.

Since the microcomputer 40 starts a counting operation in synchronization with the VSYNC signal (for driving the registration roller 302), the time during which the registration roller 302 is driven until the bottom edge of the printing paper is detected is measured. The size of the recording paper can be detected based on this time by referring to the table described in the first embodiment.

In another detection method, a sensor may be disposed downstream of the registration roller 302, the top edge detection signal of the sensor is sent to the host computer 3000 via the I/F 71, image signals are sent out in response to this signal and also the time until the bottom edge of the printing paper is detected is measured. Since several sensors are usually disposed for detecting jamming on the printing paper feed passage, an elapsed time for feeding a sheet of paper from its top edge to its bottom edge may be detected by such sensors. Also, use of a plurality of sensors makes it not necessary to measure time.

In all the cases, in this embodiment, when the paper size is detected, printing has already started. The host computer 3000 sends a command inquiring whether printing has normally terminated, and the microcomputer 40, in response to this command, sends back a status indicating an error or not as well as the detected paper size information.

(5) Notification after printing

When the entered size is not "universal" (S86), the CPU 501 determines whether the entered size matches the detected size on the basis of the received paper size information (S87). If they do not match (including a case in which the paper size is not determined), the detected size is set as the entered size.

Next, when the entered size (the detected size) does not match the specified size, assuming that a desired printout cannot be obtained, a display shown in FIG. 10D is made (S90).

When the operator desires to obtain a print of a specified size, the operator sets again printing paper of the specified size (for example, A4 in FIG. 10D) in the MP tray 111, and clicks "REPRINT". When the printing paper is set again, the entered size is updated to "UNDETERMINED".

Figure 12:
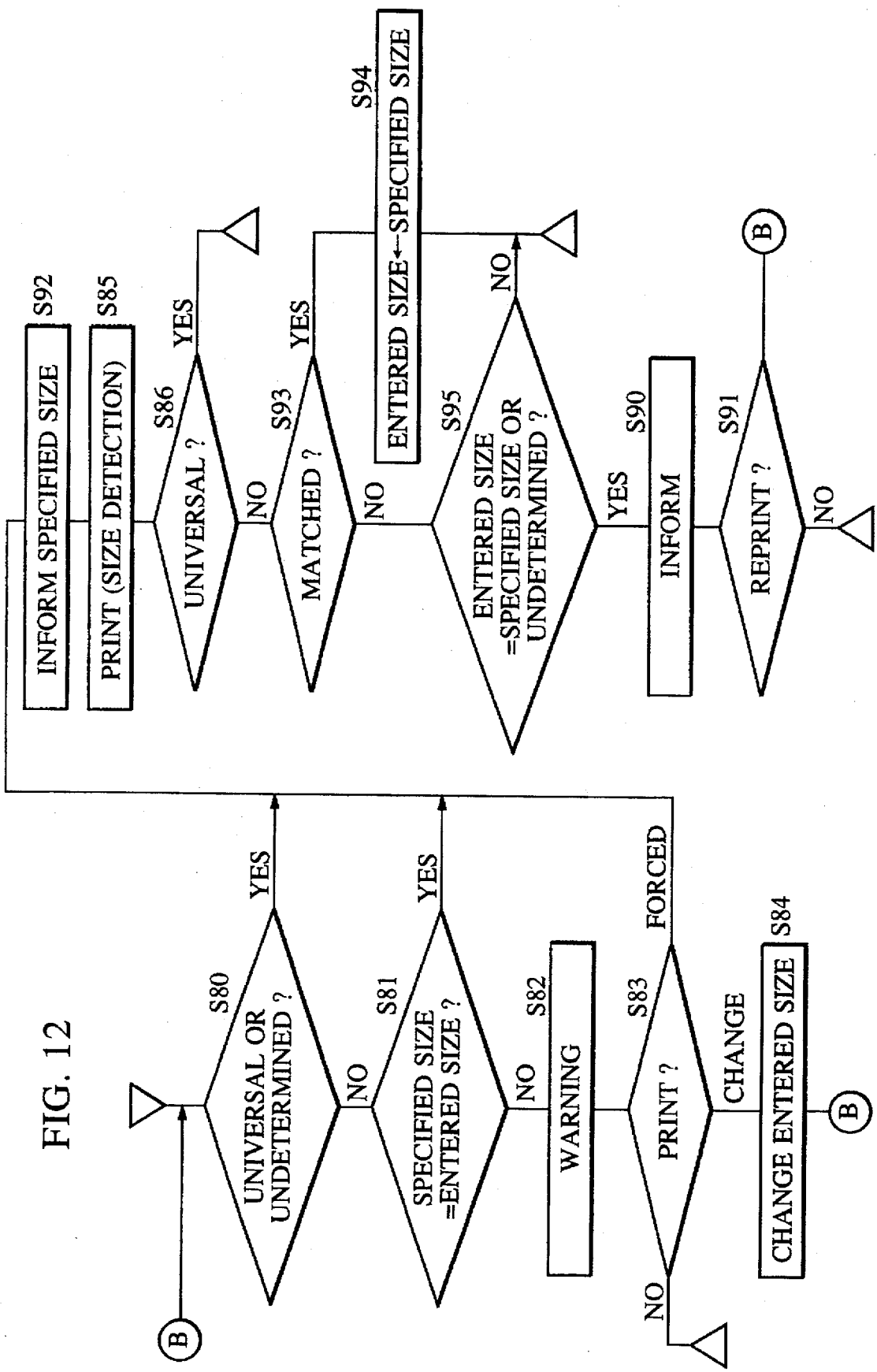

FIG. 12 shows a modification of the second embodiment of the present invention. In this modification, prior to printing, specified size information is output from the host computer 3000 (S92). The detected size information from the I/F 71 is not sent back to the host computer, but information indicating whether or not the received specified size matches the detected size is sent back.

When these sizes match (S93), the CPU 501 sets the specified size (detected size) as the entered size (S94). In the case where these sizes do not match, when the entered size matches the specified size or is "UNDETERMINED", this fact is displayed on the CRT 510 as shown in FIG. 10D. The other points are the same as in FIG. 11.

In this embodiment, in the case of the arrangement shown in FIGS. 5 and 6, reprint is performed without making the host computer 3000 send print data again.

As has been described up to this point, in the second embodiment, when the size of paper fed after the printing paper has been set in the MP tray 111 is detected and then printed, a warning about a mismatch in paper size is given before printing. Also, even if printing is performed in the state of a mismatch in paper size, it is easy to recover.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing apparatus, comprising:

measuring means for measuring the elapsed time for feeding a sheet of paper from its top to its bottom by feeding a first paper;

paper size calculating means for calculating a paper size on the basis of the measured time and the paper feeding rate which is determined by the printing apparatus;

calculated result transmitting means for transmitting the paper size calculated by the calculating means and informing an operator of the paper size;

comparing means for comparing the paper size calculated by said calculating means with the paper size specified by an external apparatus;

size setting means for setting within the printing apparatus the calculated paper size as a specified paper size for printing a second and later sheets when the above comparison indicates that both sizes match each other;

display means for displaying a mismatch of the paper size in order to inform an operator of the mismatch when the above comparison indicates that the paper sizes do not match each other; and reprint control means for reprinting the page after the operator replaces the paper.

2. A printing apparatus according to claim 1, wherein said display means comprises at least one of a display device of an external apparatus and a display device of an operation panel.

3. A printing control apparatus for controlling a printing apparatus having means for detecting the size of sheets while printing is being performed on said sheets, comprising:

means for, when the image size corresponding to image signals does not correspond to the detected size of a sheet, performing notification of this fact;

control means for making said printing apparatus reprint in response to an operation by an operator when said notifying means notifies that the image size does not correspond to the detected size of the sheet;

housing means for housing a plurality of sheets;

storing means for storing the size of sheets detected by said detecting means while printing is being performed on one of a plurality of sheets housed in said housing means; and means for, when the image size corresponding to image signals does not correspond to the detected size of the sheets stored in said storing means, giving a warning about this condition prior to printing.

4. A printing control apparatus according to claim 3, further comprising:

sheet detecting means for detecting that sheets are housed in said housing means, wherein the contents of said storing means are reset in response to an output from said sheet detecting means.

5. A printing control apparatus according to claim 4, further comprising means for storing predetermined data in said storing means in response to an operation by an operator, wherein said warning means and said notifying means are not energized regardless of the detected size of the sheet by said detecting means with respect to any image size when predetermined data has been stored in said storing means.

6. A printing control apparatus according to claim 3, further comprising a printing apparatus.

7. A printing control apparatus according to claim 6, wherein said printing apparatus records an image on a sheet by an electrostatic recording method.

8. A printer control apparatus for controlling a printer with a sheet unit at which a sheet size detector is not provided, comprising:

means for storing size data representing a size of a sheet to be set in the sheet unit, said storing means capable of storing universal size data which does not specify a concrete sheet size;

means for receiving designation data for designating a size of a sheet to be printed;

means for judging that the size data does not correspond to the designation data; and means for informing the judgment of said judging means, when the size does not correspond to the designation data except when the universal size data has been stored.

9. A printer control apparatus according to claim 8, wherein when said judging means judges that the size data does not correspond to the designation data, the size data is renewed or not renewed by the designation data and printing is performed.

10. A printer control apparatus according to claim 8, wherein when no sheet set in the sheet unit is detected, the size data is renewed by the data corresponding to any size of available sheets.

11. A printer control apparatus according to claim 8, wherein the printer comprises sheet size detecting means for detecting a size of a sheet while the sheet is being fed; and
second judging means for judging whether the designation data corresponds to the detected size.

12. A printer control apparatus according to claim 11, wherein the printer further comprises second informing means for informing the judgment of said second judging means when said second judging means judges that the designation data does not correspond to the detected size.

13. A printer control apparatus according to claim 12, wherein when the first judging means judges that the size data does not correspond to the designation data and printing is performed without renewing the size data, the second informing means does not inform non-correspondence of the designation data and the detected data.

14. A printer control apparatus according to claim 11, wherein when the designation data corresponds to the detected size, the size data is renewed by the size data corresponding to the detected size.

15. A printer control apparatus according to claim 11, wherein the printer further comprises renewing means for renewing the size data in accordance with the detected size.

16. A printer control apparatus according to claim 15, wherein the data corresponding to any size of available sheets includes one of first data which allows renewal of the size data by said renewing means, and second data which does not allow renewal of the size data by said renewing means.

17. A printer control apparatus according to claim 11, wherein the printer further comprises notifying means for notifying a message as to whether reprint is necessary or not when the detected size corresponds neither to the designation data nor to the size data.

18. A printing apparatus comprising:
a sheet unit in which a sheet is set, and at which a sheet size detector is not provided;
means for storing size data representing a size of a sheet to be set in the sheet unit, said storing means capable of storing data corresponding to any size of available sheets;
means for receiving designation data for designating a size of a sheet to be printed;
means for judging that the size data does not correspond to the designation data; and
means for informing the judgment of said judging means, when the size data does not correspond to the designation data.

19. A printing apparatus according to claim 18, wherein when said judging means judges that the size data does not correspond to the designation data, the size data is renewed or not renewed by the designation data and printing is performed.

20. A printing apparatus according to claim 18, wherein when no sheet set in the sheet unit is detected, the size data is renewed by the data corresponding to any size of available sheets.

21. A printing apparatus according to claim 18, wherein said apparatus comprises sheet size detecting means for detecting a size of a sheet while the sheet is being fed; and
second judging means for judging whether the designation data corresponds to the detected size.

22. A printing apparatus according to claim 21, wherein said apparatus further comprises second informing means for informing the judgment of the second judging means when said second judging means judges that the designation data does not correspond to the detected size.

23. A printing apparatus according to claim 22, wherein when the first judging means judges that the size data does not correspond to the designation data and printing is performed without renewing the size data, the second informing means does not inform, after printing, non-correspondence of the designation data and the detected data.

24. A printing apparatus according to claim 21, wherein when the designation data corresponds to the detected size, the size data is renewed by the size data corresponding to the detected size.

25. A printing apparatus according to claim 21, wherein said apparatus further comprises renewing means for renewing the size data in accordance with the detected size.

26. A printing apparatus according to claim 25, wherein the data corresponding to any size of available sheets includes one of first data which allows renewal of the size data by said renewing means, and second data which does not allow renewal of the size data by said renewing means.

27. A printing apparatus according to claim 21, wherein said apparatus further comprises notifying means for notifying a message as to whether reprint is necessary or not when the detected sized corresponds neither to the designation data nor to the size data.

28. A printing control method for controlling a printer with a sheet unit at which a sheet size detector is not provided, comprising the steps of:
receiving designation data for designating a size of a sheet to be printed;
judging that the size data representing a size of a sheet to be set in the sheet unit, which is stored in storing means and may correspond to any size of available sheets does not correspond to the designation; and
informing the judgment of said judging means, when the size data does not correspond to the designation data.

29. A printer control method according to claim 28, wherein said method further comprises a step of deciding, in accordance with an operation by an operator, whether printing is performed with a renewing or without renewing the size data by the designation data, when said judging means judges that the size data stored in the storing means does not correspond to the designation data.

30. A printer control method according to claim 28, wherein said method further comprises a step of renewing the size data by the data corresponding to any size of available sheets, when no sheet set in the sheet unit is detected.

31. A printer control method according to claim 28, wherein the printer comprises sheet size detecting means for detecting a size of a sheet while the sheet is being fed; and
said method comprises a second step of judging whether the designation data corresponds to the detected size.

32. A printer control method according to claim 31, wherein said method further comprises a step of deciding whether the judgment is notified or not, when it is judged in the second judging step that the designation data does not correspond to the detected size.

33. A printer control method according to claim 32, wherein when the size data does not correspond to the designation data and printing is performed with renewing the size data, non-correspondence of the designation data and the detected data is not informed after printing.

34. A printer control method according to claim 31, wherein when the designation data corresponds to the detected size, the size data is renewed by size data corresponding to the detected size.

35. A printer control method according to claim 31, wherein said method further comprises a step of renewing the size data in accordance with the detected size.

36. A printer control method according to claim 35, wherein the data corresponding to any size of available sheets includes one of first data which allows renewal of the size data by said renewing means, and second data which does not allow renewal of the size data by said renewing means.

37. A printer control method according to claim 31, wherein said method further comprises a step of notifying a message as to whether reprint is necessary or not when the detected size corresponds neither to the designation data nor to the size data.

* * * * *

UNITED STATES PATENT AND TRADEMARK OFFICE
CERTIFICATE OF CORRECTION

PATENT NO. : 5,678,124
DATED : October 14, 1997
INVENTOR(S) : Yutaka TOKURA

It is certified that error appears in the above-identified patent and that said Letters Patent is hereby corrected as shown below:

Column 2, line 24, after "in", insert --a--;
       Line 26, after "having", insert --a--.

Column 3, line 41, delete "the".

Column 5, line 19, delete "feed" and insert therefor --feeding--;
       Line 24, delete "201" and insert therefor --306--.

Column 8, line 31, delete "changes" and insert therefor --change--;
       Line 33, delete "printing is forcedly performed" and insert therefor --forcibly perform printing--;
       Line 34, delete "occur" and insert therefor --occurs--;
       Line 36, delete "(4)" and insert therefor --④--;

Column 12, line 34, delete "printing" and insert therefor --printer--;
       Line 49, delete "a".

Signed and Sealed this

Twenty-sixth Day of May, 1998

Attest:

BRUCE LEHMAN

*Attesting Officer*       *Commissioner of Patents and Trademarks*